United States Patent
Lim

(10) Patent No.: US 12,170,830 B2
(45) Date of Patent: Dec. 17, 2024

(54) ELECTRONIC APPARATUS AND METHOD FOR CONTROLLING THEREOF

(71) Applicant: SAMSUNG ELECTRONICS CO., LTD., Suwon-si (KR)

(72) Inventor: Chaeseung Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 214 days.

(21) Appl. No.: 17/585,149

(22) Filed: Jan. 26, 2022

(65) Prior Publication Data

US 2022/0217453 A1  Jul. 7, 2022

Related U.S. Application Data

(63) Continuation of application No. PCT/KR2021/012764, filed on Sep. 17, 2021.

(30) Foreign Application Priority Data

Jan. 7, 2021 (KR) .................. 10-2021-0002171

(51) Int. Cl.
*H04N 21/8549* (2011.01)
*G06V 10/764* (2022.01)
*G06V 10/82* (2022.01)
*G10L 15/26* (2006.01)

(52) U.S. Cl.
CPC ....... *H04N 21/8549* (2013.01); *G06V 10/764* (2022.01); *G06V 10/82* (2022.01); *G10L 15/26* (2013.01)

(58) Field of Classification Search
CPC .. H04N 21/8549; G06V 10/82; G06V 10/764; G10L 15/26
See application file for complete search history.

(56) References Cited

U.S. PATENT DOCUMENTS

| | | | |
|---|---|---|---|
| 7,454,390 B2 | 11/2008 | Nagamitsu et al. | |
| 10,999,566 B1 * | 5/2021 | Mahyar ................ | G06F 40/166 |
| 11,184,679 B2 | 11/2021 | Kim et al. | |

(Continued)

FOREIGN PATENT DOCUMENTS

| JP | 2017-68578 A | 4/2017 |
|---|---|---|
| JP | 6610416 B2 | 11/2019 |

(Continued)

OTHER PUBLICATIONS

International Search Report dated Dec. 29, 2021 issued by the International Searching Authority in International Application No. PCT/KR2021/012764 (PCT/ISA/210).

(Continued)

*Primary Examiner* — Girumsew Wendmagegn
(74) *Attorney, Agent, or Firm* — Sughrue Mion, PLLC

(57) ABSTRACT

A method for controlling an electronic apparatus includes: obtaining a video including content that performs a task; identifying, within a first portion of the video, an object and motion information corresponding to the object; obtaining first text that describes the first portion of the video based on information corresponding to the object and the motion information; obtaining second text based on voice information obtained from the first portion of the video; and providing information for performing the task based on the first text and the second text.

13 Claims, 15 Drawing Sheets

(56) References Cited

U.S. PATENT DOCUMENTS

2019/0220668 A1    7/2019  Siskind et al.
2020/0302177 A1    9/2020  Nguyen
2020/0380976 A1  12/2020  Lee et al.
2021/0118447 A1*  4/2021  Kim ........................ G06F 40/30

FOREIGN PATENT DOCUMENTS

| KR | 10-1914661 B1 | 11/2018 |
| KR | 10-1982240 B1 | 5/2019 |
| KR | 10-2019-0095620 A | 8/2019 |
| KR | 10-2019-0132885 A | 11/2019 |
| KR | 10-2052409 B1 | 12/2019 |
| KR | 10-2020-0040097 A | 4/2020 |
| WO | 2005/088542 A1 | 9/2005 |

OTHER PUBLICATIONS

Written Opinion dated Dec. 29, 2021 issued by the International Searching Authority in International Application No. PCT/KR2021/012764 (PCT/ISA/237).

* cited by examiner

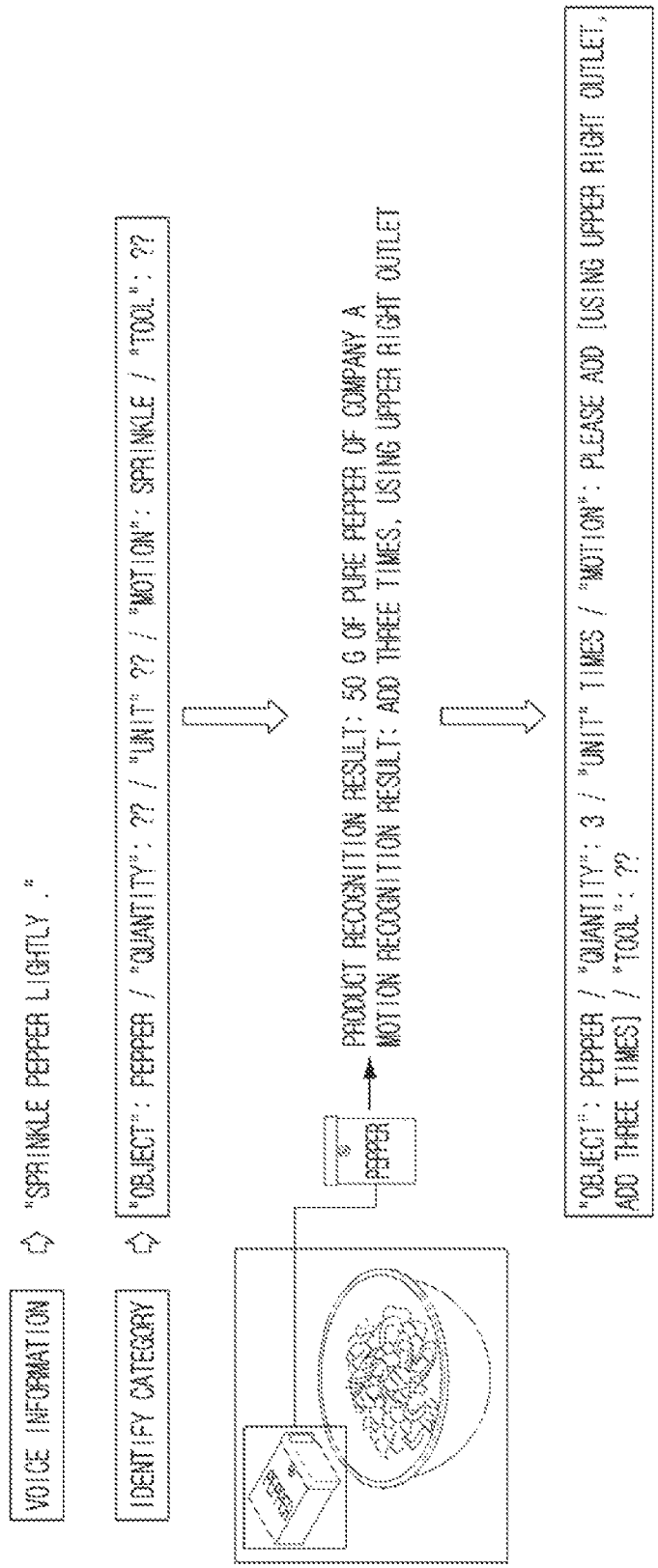

ELECTRONIC APPARATUS AND METHOD FOR CONTROLLING THEREOF

CROSS-REFERENCE TO RELATED APPLICATION(S)

This application is a bypass continuation of International Application No. PCT/KR2021/012764, filed on Sep. 17, 2021, which is based on and claims priority to Korean Patent Application No. 10-2021-0002171, filed on Jan. 7, 2021, in the Korean Intellectual Property Office, the disclosures of which are incorporated by reference herein in their entireties.

BACKGROUND

1. Field

The disclosure relates to an electronic apparatus and a method for controlling thereof, and more particularly, to an electronic apparatus that provides information for performing a specific task included in a moving picture, and a method for controlling thereof.

2. Description of Related Art

Moving pictures (videos) including content that performs a specific task are becoming more prevalent. The specific task may refer to a task that performs a series of actions, such as a task for performing cooking and a task for performing makeup.

Accordingly, there is a need to summarize and provide information for performing the specific task based on the video that includes content that performs the specific task.

SUMMARY

Provided is an electronic apparatus that provides information for performing a specific task based on a moving picture including content that performs the specific task, and a method for controlling thereof.

According to an aspect of the disclosure, a method for controlling an electronic apparatus may include obtaining a video including content that performs a task; identifying, within a first portion of the video, an object and motion information corresponding to the object; obtaining first text that describes the first portion of the video based on information corresponding to the object and the motion information; obtaining second text based on voice information obtained from the first portion of the video; and providing information for performing the task based on the first text and the second text.

The obtaining of the second text may include converting the voice information obtained from the first portion of the video into text; and selecting text related to the first text among converted texts as the second text for describing the first portion of the video based on a degree of similarity between the first text and the converted text.

The obtaining the second text may further include obtaining the text that is related to the first text as the second text for describing the first portion of the video by analyzing an image corresponding to the voice information.

The information for performing the task may be obtained based on category information obtained from the first text and the second text, and the category information includes one or more of object information, quantity information, unit information, tool information, or the motion information.

The providing of the information for performing the task may include obtaining first category information from the first text; obtaining second category information from the second text; and determining whether a combination of the first category information and the second category information is sufficient to obtain information for performing a sub-task corresponding to the first portion of the video.

The method may further include obtaining, based on a determination that the combination of the first category information and the second category information is insufficient, third category information by analyzing an image within the first portion of the video to obtain the information for performing the sub-task corresponding to the first portion of the video; and obtaining the information for performing the sub-task corresponding to the first portion of the video based on the first category information, the second category information, and the third category information.

The obtaining the third category information may include obtaining product information corresponding to the object; and obtaining at least one of quantity information or unit information based on the product information and the motion information corresponding to the object.

The obtaining the third category information includes obtaining volume information corresponding to the object by performing image segmentation for the object; and obtaining at least one of quantity information or unit information based on the volume information.

The method may further include obtaining, based on a determination that the combination of the first category information and the second category information is sufficient, the information for performing sub-tasks corresponding to the first portion of the video; and providing the information for performing the task by acquiring information for performing a sub-task corresponding to each portion of the video among a plurality of portions.

The video may be obtained from a stream, and the object and the motion information may be identified while the video is reproduced.

According to another aspect of the disclosure, an electronic apparatus may include a memory configured to store one or more instructions; and one or more processors configured to execute the one or more instructions stored in the memory to: obtain a video including content that performs a task; identify, within a first portion of the video, an object and motion information corresponding to the object; obtain first text that describes the first portion of the video based on information corresponding to the object and the motion information; obtain second text based on voice information obtained from the first portion of the video; and provide information for performing the task based on the first text and the second text.

The one or more processors may be further configured to execute the one or more instructions to convert the voice information obtained from the first portion of the video into text; and select text related to the first text among converted texts as the second text for describing the first portion of the video based on a degree of similarity between the first text and the converted text.

The one or more processors may be further configured to execute the one or more instructions to obtain the text that is related to the first text as the second text for describing the first portion of the video by analyzing an image corresponding to the voice information.

The information for performing the task may be obtained based on category information obtained from the first text and the second text, and the category information includes one or more of object information, quantity information, unit information, tool information, or the motion information.

The one or more processors may be further configured to execute the one or more instructions to: obtain first category information from the first text; obtain second category information from the second text; and obtain whether a combination of the first category information and the second category information is sufficient to obtain information for performing a sub-task corresponding to the first portion of the video.

According to the diverse embodiments as described above, the electronic apparatus may provide information for performing the specific task included in the moving picture by further using voice information as well as image information of the moving picture.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 is a diagram showing a process of additionally acquiring category information by further using a product recognition model, when category information acquired based on a first text and a second text corresponding to voice information is insufficient according to an embodiment;

DETAILED DESCRIPTION

Figure 1:
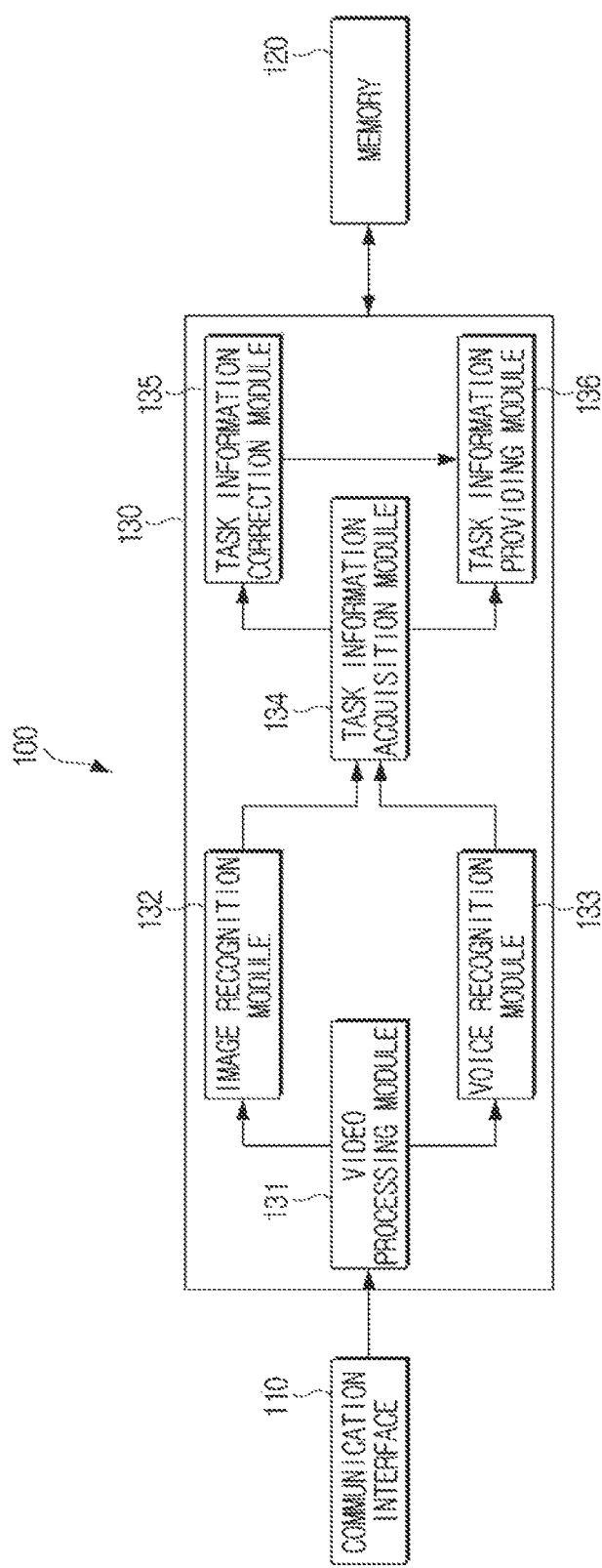
FIG. 1 is a block diagram showing a configuration of an electronic apparatus according to an embodiment.

Hereinafter, the disclosure will be described in detail with reference to the drawings.

An expression such as "have", "may have", "include", "may include", or the like, indicates an existence of a corresponding feature (for example, a numerical value, a function, an operation, a component such as a part, or the like), and does not exclude an existence of an additional feature.

An expression "A or B", "at least one of A and/or B", "one or more of A and/or B", or the like, may include all possible combinations of items listed together. For example, "A or B", "at least one of A and B", or "at least one of A or B" may refer to all cases (1) including at least one A, (2) including at least one B, or (3) including both at least one A and at least one B. Expressions "first", "second", or the like, used in the disclosure may indicate various components regardless of a sequence and/or importance of the components, will be used only in order to distinguish one component from the other components, and do not limit the corresponding components.

When it is mentioned that any component (e.g., a first component) is (operatively or communicatively) coupled with/to or is connected to another component (e.g., a second component), it is to be understood that any component is directly coupled with/to another component or may be coupled with/to another component through the other component (e.g., a third component). On the other hand, when it is mentioned that any component (e.g., a first component) is "directly coupled with/to" or "directly connected to" to another component (e.g., a second component), it is to be understood that the other component (e.g., a third component) is not present between any component and another component.

An expression "configured (or set) to" used in the disclosure may be replaced by an expression "suitable for", "having the capacity to", "designed to", "adapted to", "made to", or "capable of" depending on a situation. A term "configured (or set) to" may not necessarily mean only "specifically designed to" in hardware. Instead, in any context, an expression "a device configured to" may mean that the device is "capable of" together with other devices or components. For example, a "sub-processor configured (or set) to perform A, B, and C" may mean a dedicated processor (e.g., an embedded processor) for performing the corresponding operations or a generic-purpose processor (for example, a central processing unit (CPU) or an application processor) that may perform the corresponding operations by executing one or more software programs stored in a memory device.

On the other hand, the term "~ or" or "module" used in the disclosure includes a unit composed of hardware, software, or firmware, and may be used interchangeably with the term such as logic, logic block, component, or circuit. The "~ or" or "module" may be an integrally formed component or a minimum unit of performing one or more functions or a portion thereof. For example, the module may be configured as an application-specific integrated circuit (ASIC).

FIG. 1 is a block diagram illustrating a configuration of an electronic apparatus according to an embodiment.

Referring to FIG. 1, the electronic apparatus 100 may include a communication interface 110, a memory 120, and a processor 130. The electronic apparatus 100 may be implemented as various forms of electronic apparatuses such as a smartphone, an augmented reality (AR) glass, a tablet personal computer (PC), a mobile phone, an image phone, an e-book reader, a TV, a desktop PC, a laptop PC, a netbook computer, a workstation, a camera, and a smart watch.

The communication interface 110 is a component that may perform communication with various types of external devices according to various types of communication methods. The communication interface 110 may include a wireless fidelity (Wi-Fi) chip, a Bluetooth chip, a wireless communication chip, and a near field communication (NFC) chip. The processor 130 may perform communication with various external devices using the communication interface 110. Specifically, the electronic apparatus 100 may receive a video including content that performs a specific task through the communication interface 110. As an example, the electronic apparatus 100 may receive the video in real time in a streaming method through the communication interface 110. The streaming method is a method of receiving and providing data in real time from an external server or an external device through a wired or wireless communication method. However, the disclosure is not limited thereto, and the electronic apparatus 100 may download the video through the communication interface 110 and store the downloaded video in the memory 120.

The memory 120 may store various programs and data necessary for an operation of the electronic apparatus 100. Specifically, the memory 120 may store at least one instruction. The processor 130 may perform the operation of the electronic apparatus 100 by executing the instruction stored in the memory 120.

The processor 130 may be electrically connected to the memory 120 to control an overall operation and function of the electronic apparatus 100. In particular, the processor 130 may provide a task information providing function for describing the video including content that performs the specific task acquired through the communication interface 110. The task information providing function according to the disclosure may include a video processing module 131, an image recognition module 132, a voice recognition module 133, a task information acquisition module 134, a task information correction module 135, and a task information providing module 136 as shown in FIG. 1, and the respective modules may be stored in the memory 120.

In addition, in order to perform the task information providing function, the plurality of modules 131 to 136 may be loaded into a memory (e.g., a volatile memory) included in the processor 130. That is, when the task information providing function is executed, the processor 130 may load the plurality of modules 131 to 136 from the non-volatile memory to the volatile memory to execute the respective functions of the plurality of modules 131 to 136. The loading refers to an operation of calling and storing data stored in the non-volatile memory into the volatile memory so that the processor 130 may access the data.

According to an embodiment, as illustrated in FIG. 1, the task information providing function may be implemented through the plurality of modules 131 to 136 stored in the memory 120, but the disclosure is not limited thereto, and the task information providing function may be implemented through an external server.

The plurality of modules 131 to 136 may be implemented as respective software, but are not limited thereto, and some modules may be implemented as a combination of hardware and software. As another example, the plurality of modules 131 to 136 may be implemented with one piece of software. In addition, some modules may be implemented in the electronic apparatus 100, and some other modules may be implemented in the external server.

The video processing module 131 may process a video received from the communication interface 110. Specifically, the video processing module 131 may acquire a video including content that performs a specific task from the communication interface 110. As an example, the video processing module 131 may acquire a video for performing a cooking task according to a series of processes, a video for performing a make-up task according to a series of processes, and the like.

In addition, the video processing module 131 may transmit information on an image of the acquired video to the image recognition module 132 and transmit information on voice of the video to the voice recognition module 133.

The image recognition module 132 may acquire a first text for describing a specific task through the information on the image of the video received from the communication interface 110.

Specifically, the image recognition module 132 may acquire a first text for describing a specific portion of the video based on image frames of the specific portion of the video included in the video. For example, the image recognition module 132 may identify an object included in a corresponding portion of the video and motion information corresponding to the object through an image frame within a first portion of the video.

Figure 2A:
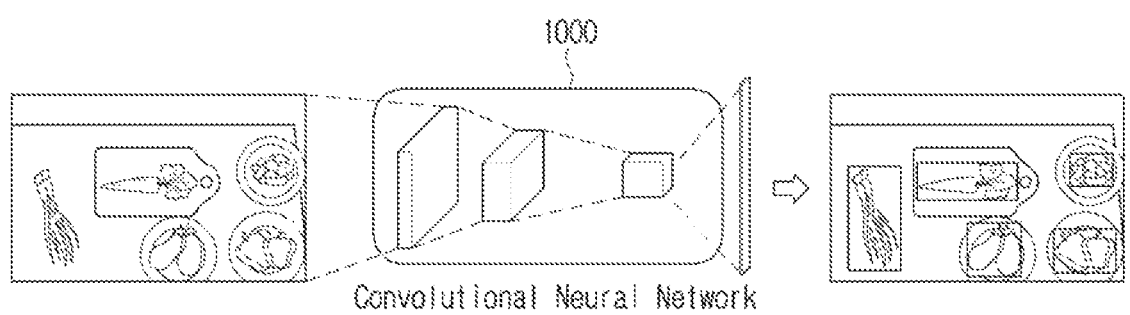
FIG. 2A is a diagram for describing an object recognition model according to an embodiment.

As an example, the image recognition module 132 may identify the object included in the video through an object recognition model 1000 shown in FIG. 2A.

FIG. 2A is a diagram for describing an object recognition model 1000 according to an embodiment. Referring to FIG. 2A, the object recognition model 1000 may be implemented as a convolution artificial neural network model, and may receive an image frame and output information on an object included in the image. In addition, the object recognition model 1000 may be trained based on an image frame for an object that may be used in a specific task. Accordingly, the object recognition model 1000 may receive the video and detect an object for each frame of the received image.

Figure 2B:
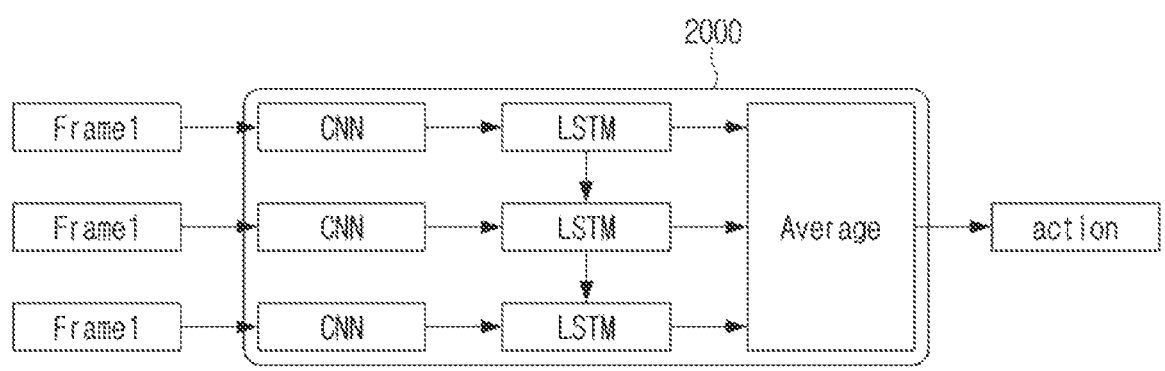
FIG. 2B is a diagram for describing a motion recognition model according to an embodiment.

As an example, the image recognition module 132 may identify motion information included in the video through a motion recognition model 2000 shown in FIG. 2B.

FIG. 2B is a diagram for describing a motion recognition model according to an embodiment. Referring to FIG. 2B, the motion recognition model 2000 may receive an image frame and output information on a motion included in the image. For example, the motion recognition model 2000 may be trained based on a plurality of videos for performing a specific task. For example, the motion recognition model 2000 may include a Convolutional Neural Networks (CNN) layer and a Long-Short Term Memory (LSTM) layer. That is, the motion recognition model 2000 may extract feature vectors of each frame of the plurality of videos through the CNN layer, and provide the extracted feature vectors as input data of the LSTM layer, thereby finally extracting a comprehensive feature vector of consecutive frames of the video. In addition, learning about the motion recognition model 2000 may be performed by labeling what motion the extracted comprehensive feature vector means. Accordingly, the motion recognition model 2000 may receive the video and acquire information on a motion included in the image.

In addition, the image recognition module 132 may identify a first portion of the video that performs the identified motion information based on the identified object among the plurality of image frames included in the video, based on the identified object and motion information, and acquire a first text for describing the first portion of the video.

For example, the image recognition module 132 may identify frames in which object information of 'chicken' and motion information of 'wash' are detected among a plurality of frames included in the video for providing a recipe for chicken dishes as a first portion of the video in which a motion washing the chicken is performed. In addition, the image recognition module 132 may acquire a text of 'wash the chicken' as a first text for describing the first portion of the video.

For example, the image recognition module 132 may identify frames in which object information of 'potato' and 'knife' and motion information of 'cut' are detected among a plurality of frames included in the video for providing a recipe for chicken dishes as a second portion of the video in which a motion cutting the potato is performed. In addition, the image recognition module 132 may acquire a text of 'cut the potato with the knife' as a first text for describing the second portion of the video.

The voice recognition module 133 may convert voice information included in the video received from the communication interface 110 into text data.

For example, when the video includes voice information of 'Please wash chicken well in water', the voice recognition module 133 may convert the corresponding voice information into text data.

For example, the voice recognition module 133 may include an acoustic model and a language model. For example, the acoustic model may include information related to vocalization, and the language model may include unit phoneme information and information on a combination of unit phoneme information. The voice recognition module may convert the voice information into the text data by using information related to the vocalization and the information on the unit phoneme information.

The task information acquisition module 134 may acquire a second text corresponding to the first texts by matching the first text acquired through the image information with the voice information included in the video.

Specifically, the task information acquisition module 134 may match the first text for describing the first portion of the video acquired through the image recognition module 132 with text data acquired through the voice recognition module 133 to identify text data related to the first text among the plurality of text data as the second text. As an example, the task information acquisition module 134 may compare the text data with the first text to acquire a degree of similarity, and may identify text data related to the first text as the second text based on the acquired degree of similarity.

For example, the task information acquisition module 134 may match text data of 'Please wash chicken well in water' acquired through the voice recognition module 133 with a first text of 'Wash chicken' for describing the first portion of the video to identify the corresponding text as the second text for describing the first portion of the video.

For example, the task information acquisition module 134 may match the text data of 'Please cut roughly potato of about one number into easy-to-eat' acquired through the voice recognition module 133 with a first text of 'Cut potato with knife' for describing the second portion of the video to identify the corresponding text as the second text for describing the second portion of the video. In addition, when 'Just cut potato of about one number into easy-to-eat pieces' is acquired, the task information acquisition module 134 may match the corresponding text data with the first text of 'Cut potato with knife' for describing the second portion of the video to identify the corresponding text as the second text for describing the second portion of the video.

In addition, the task information acquisition module 134 may identify whether or not information for performing a task corresponding to each portion of the video included in the video may be generated based on the acquired first and second texts.

That is, the task information acquisition module 134 may acquire at least one category information based on the first text and the second text corresponding to a specific portion of the video. As an example, the category information may include object information, quantity information, unit information, tool information, and motion information. The object information may be information on a subject performing a specific task in the corresponding portion of the video, and may be information on an object acquired by the voice recognition module 133. In addition, the quantity information may be information on a quantity corresponding to the corresponding object, and the unit information may mean information on a unit corresponding to the corresponding object. In addition, the tool information may mean information on an item used when performing a specific operation on the corresponding object.

Figure 2C:
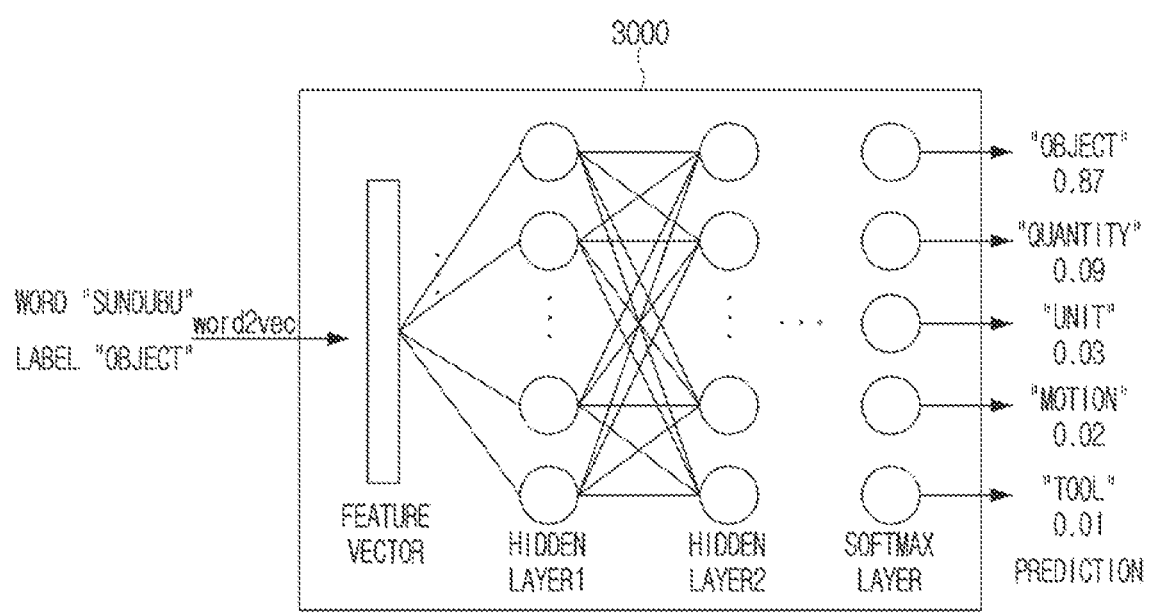
FIG. 2C is a diagram for describing a category classification model 3000 according to an embodiment.

According to an embodiment, the task information acquisition module 134 may identify a category included in the first text or the second text through the category classification model 3000 shown in FIG. 2C.

FIG. 2C is a diagram for describing a category classification model 3000 according to an embodiment. Referring to FIG. 2C, the category classification model 3000 may be trained based on training data in which category information is labeled in a text that may be used when performing a specific task. As an example, the category classification model 3000 for a cooking task may be trained through training data in which a word 'sundubu' is labeled with 'the object information' among the category information and a word 'cut' is labeled with the 'motion information' among the category information In addition, when the text 'sundubu' is input to the trained category classification model 3000, the category classification model 3000 may identify that 'the object information' among the plurality of category information is category information corresponding to the text 'sundubu'.

In addition, the task information acquisition module 134 may identify whether the acquired category information is sufficient to generate information (task information) for performing a task based on the first text and the second text corresponding to the corresponding portion of the video.

For example, through the first text of 'Cut potato with knife' and the second text of 'Just cut potato of about one number into easy-to-eat pieces' corresponding to the second portion of the video, the task information acquisition module 134 may identify the object information of the second portion of the video as 'potato', the quantity information as '1', the unit information as 'number', the tool information as 'knife', and the motion information as 'cut'. In addition, because all category information corresponding to the second portion of the video has been acquired, the task information acquisition module 134 may identify that the acquired category information is sufficient to generate the task information corresponding to the second portion of the video through the first text and the second text corresponding to the second portion of the video.

However, the disclosure is not limited thereto, and the task information acquisition module 134 may determine that the category information is sufficient to generate the task information even when the category information acquired based on the first text and the second text includes at least four pieces of information among the object information, the quantity information, the unit information, the tool information, and the motion information. That is, even when the object information, the quantity information, the unit information, and the motion information are identified based on the first text and the second text, but the tool information is not identified, the task information acquisition module 134 may identify as sufficient to generate the task information.

As an example, when the category information corresponding to the object information, the quantity information, the unit information, the tool information, and the motion information is all acquired through the first text and the second text corresponding to the first portion of the video, the task information acquisition module 134 may identify as sufficient to generate task information corresponding to the first portion of the video.

When it is determined that the category information is sufficient to generate the task information corresponding to the first portion of the video through the first text and the second text corresponding to the first portion of the video, the task information corresponding to the first portion of the video may be acquired through the task information providing module 136.

On the other hand, when at least one category information among the plurality of category information is not acquired through the first text and the second text corresponding to the first portion of the video, the task information acquisition module 134 may determine that the category information is insufficient to generate the task information corresponding to the first portion of the video. However, the disclosure is not limited thereto, and when at least one of the quantity information and the unit information among the plurality of category information is not acquired through the first text and the second text corresponding to the first portion of the video, the task information acquisition module 134 may determine that the category information is insufficient to generate the task information corresponding to the first portion of the video.

For example, through a first text of 'Tut sesame seeds' and a second text of 'Please add sesame seeds last' corresponding to a third portion of the video, the task information acquisition module 134 may identify object information of the third portion of the video as 'sesame seeds' and motion information as 'put'. In addition, because quantity information, unit information, and tool information of the third portion of the video are not acquired through the first text and the second text, the task information acquisition module 134 may determine that the category information is insufficient to generate task information corresponding to the third portion of the video through the first text and the second text corresponding to the third portion of the video.

When it is determined that the category information is insufficient to generate the task information corresponding to the first portion of the video through the first text and the second text corresponding to the first portion of the video, the category information corresponding to the first portion of the video may be further acquired through the task information correction module 135.

The task information correction module 135 may analyze an image to acquire category information of a corresponding portion of the video. That is, when the category information is insufficient to generate the task information corresponding to the first portion of the video through the first text and the second text corresponding to the first portion of the video, the task information correction module 135 may further acquire category information by analyzing the image of the first portion of the video.

According to an embodiment, the task information correction module 135 may acquire at least one of quantity information and unit information of the first portion of the video by using a product recognition model.

The product recognition model may recognize product information on an object. The product recognition model may perform learning through image data of a product required to perform a specific task.

As an example, when it is identified from the object recognition model 1000 that an object corresponding to a specific portion of the video is 'pepper', but at least one of quantity information and unit information among category information of the corresponding portion of the video is not identified through the task information acquisition module 134, the task information correction module 135 may identify product information of the object identified as 'pepper' i.e., manufacturer information, container capacity information, and the like by using the product recognition model. In addition, when it is identified from the motion recognition model 2000 that motion information corresponding to a pepper container is 'add three times through upper right outlet', the task information correction module 135 may identify quantity information of a corresponding portion of the video as '3' and unit information as 'times'. In addition, the task information correction module 135 may further acquire motion information of 'add three times through upper right outlet based on 50 G of 000 product pure pepper'. In addition, the task information providing module 136 may generate task information of the corresponding portion of the video by further using the category information acquired from the task information correction module 135.

According to an embodiment, the task information correction module 135 may acquire at least one of quantity information and unit information of the first portion of the video by using a volume measurement model.

The volume measurement model may acquire volume information of an object, and may be implemented through a deep learning artificial intelligence model that predicts a volume corresponding to an object corresponding to a specific task.

The task information correction module 135 may detect an object portion within a specific portion of the video by using the volume measurement model, divide the entire region and the corresponding object region, and calculate each ratio. In addition, the task information correction module 135 may measure a volume of the object by applying the calculated ratio to the volume recognition result corresponding to the entire region by using the volume measurement model. As an example, when the object corresponding to a specific portion of the video is 'pepper' and the motion is 'put', the volume measurement model may calculate a ratio of a volume of the entire container region to a region corresponding to the pepper as 0.6. In addition, the volume measurement model may measure the volume of the entire container region as 100 ml, and measure volume information of the region corresponding to 'pepper' as 60 ml by applying the ratio calculated from the volume of the entire container region. In addition, the task information correction module 135 may identify quantity information corresponding to the corresponding portion of the video as '60' and unit information as 'ml' based on the measured volume information. In addition, the task information providing module 136 may generate task information of the corresponding portion of the video by further using the category information acquired from the task information correction module 135.

In the above-described embodiment, it has been described that the category information is additionally acquired by using the task information correction module 135 when the category information is insufficient to generate the task information through the first and second texts corresponding to the specific portion of the video, but the disclosure is not limited thereto. As an example, when there is voice information that does not match the first text among the voice information of the video, the task information correction module 135 may match the voice information with the first text by using the image corresponding to the voice information. That is, the task information acquisition module 134 may identify text data that does not match the first text among a plurality of text data acquired by the voice recognition module 133, and the task information correction module 135 may acquire object information corresponding to the text data by analyzing an portion of the video corresponding to the text data that does not match the first text using the object recognition model 1000. In addition, the voice information may be matched with the first text based on the acquired object information.

For example, when the task information acquisition module 134 identifies text data corresponding to the voice information 'I'll add three of these' as text data that does not match the first text, the task information correction module 135 may recognize an object of 'red pepper' in an image of a section in which the voice information corresponding to the text data is uttered by using the object recognition model 1000. In addition, the task information correction module 135 may match the corresponding text data with the first text of the portion of the video corresponding to the object of 'red pepper'.

The task information providing module 136 may acquire task information of each of the portions of the video included in the video by using the category information acquired from the task information acquisition module 134 and the task information correction module 135.

When the task information acquisition module 134 determines that the category information is sufficient to generate task information corresponding to the first portion of the video through the first text and the second text corresponding to the specific portion of the video, the task information providing module 136 may generate task information of the corresponding portion of the video by using the first text and the second text.

On the other hand, the task information acquisition module 134 determines that the category information is insufficient to generate task information corresponding to the first portion of the video through the first text and the second text corresponding to the specific portion of the video, the task information providing module 136 may generate task information of the corresponding portion of the video by using the first text and the second text, and the category information acquired from the task information correction module 135.

In addition, the task information acquisition module 134 may provide task information corresponding to the video by synthesizing information for performing the task of each of the portions of the video included in the video. For example, through a video of performing a cooking test, the task information acquisition module 134 may generate and provide recipe information summarizing a series of processes performed in the corresponding video. That is, the task information acquisition module 134 may acquire recipe information of 'wash chicken in water' through a first text (wash chicken) and a second text (please wash chicken well in water) of the first portion of the video. In addition, the task information acquisition module 134 may further acquire additional information on the recipe information based on the second text and provide the acquired additional information together with the recipe information, which will be described with reference to the drawings below.

According to the embodiments as described above, the electronic apparatus may provide information on the video by further using the voice information as well as the image information included in the video. In addition, the electronic apparatus may provide information for performing the specific task corresponding to the video by using the various artificial intelligence models described above.

Figure 3:
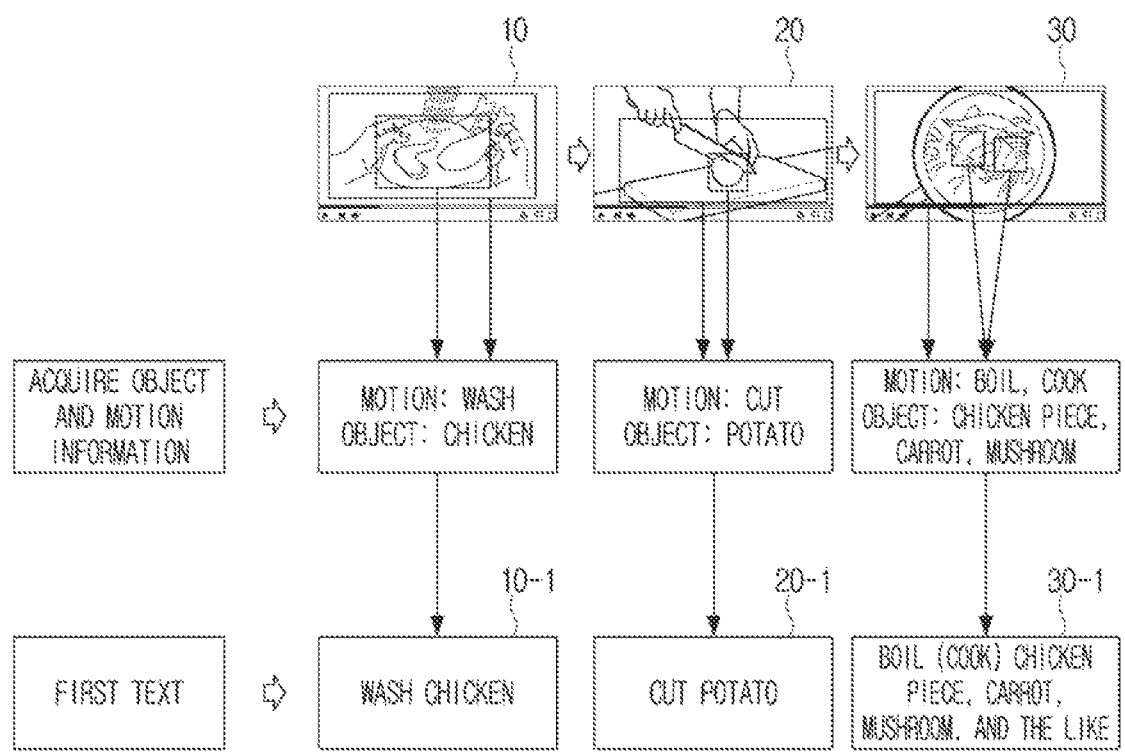
FIG. 3 is a diagram showing a process of acquiring a first text for describing each of a plurality of image sections of a video according to an embodiment.

FIG. 3 is a diagram showing a process of acquiring a first text for describing each of a plurality of portions of the video according to an embodiment.

According to an embodiment, the electronic apparatus 100 may acquire a video including chicken dish content. In addition, the electronic apparatus 100 may acquire an object and motion information corresponding to the object by using image information of each of image frames of the acquired video. In addition, the electronic apparatus 100 may identify a plurality of portions included in the video based on the acquired object and motion information. As an example, referring to FIG. 3, the electronic apparatus 100 may identify image frames in which an object of 'chicken' and motion information of 'wash' among a plurality of image frames included in the video are acquired as a first portion of the video 10. In addition, the electronic apparatus 100 may identify image frames in which an object of 'potato' and motion information of 'cut' among a plurality of image frames included in the video are acquired as a second portion of the video 20. In addition, the electronic apparatus 100 may identify image frames in which objects of 'chicken piece', 'carrot', and 'mushroom' and motion information of 'boil' and 'cook' among a plurality of image frames included in the video are acquired as a third portion of the video 30.

In addition, the electronic apparatus 100 may acquire a first text for describing a task of each of the portions of the video based on the object and motion information corresponding to each of the identified portions of the video.

That is, the electronic apparatus 100 may acquire a text 10-1 of 'wash chicken' based on the object (chicken) and the motion information (wash) corresponding to the first portion of the video 10, and identify the text 10-1 as the first text for describing the first portion of the video. In addition, the electronic apparatus 100 may acquire a text 20-1 of 'cut potato' based on the object (potato) and the motion information (cut) corresponding to the second portion of the video 20, and identify the text 20-1 as the first text for describing the second portion of the video. In addition, the electronic apparatus 100 may acquire a text 30-1 of 'boil (cook) chicken piece, carrot, mushroom, and the like' based on the objects ('chicken piece', 'carrot', and 'mushroom') and the motion information ('boil' and 'cook') corresponding to the third portion of the video 30, and identify the text 30-1 as the first text for describing the third portion of the video.

Figure 4:
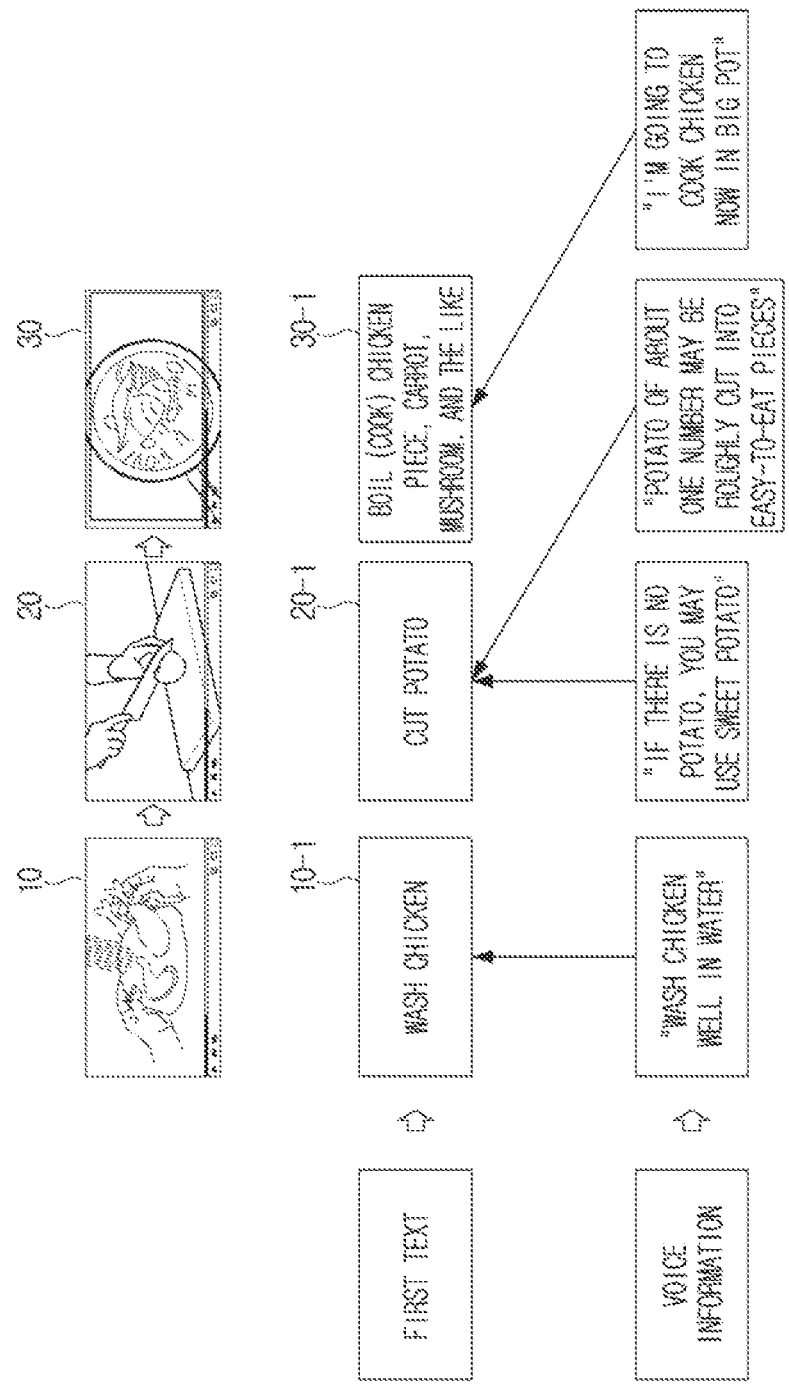
FIG. 4 is a diagram showing a process of identifying a first text for each of a plurality of image sections of a video and voice information corresponding thereto according to an embodiment.

FIG. 4 is a diagram showing a process of identifying a first text for each of a plurality of portions of a video and voice information corresponding thereto according to an embodiment.

When the first text for describing each of the portions of the video is acquired through FIG. 3, the electronic apparatus 100 may match each of the voice information included in the video to a plurality of portions of the video. As an example, the electronic apparatus 100 may convert the voice information included in the video into text data through the voice recognition module 133. In addition, the electronic apparatus 100 may acquire the degree of similarity between the converted text data and the first texts in each of the plurality of portions of the video through the task information acquisition module 134. In addition, the electronic apparatus 100 may match the converted text data with each of the plurality of portions of the video based on the acquired degree of similarity.

Referring to FIG. 4, the electronic apparatus 100 may convert voice information of "wash chicken well in water" into text data, and may match the corresponding voice information with the first portion of the video corresponding to the text 10-1 of "wash chicken" based on the degree of similarity to each of the plurality of first texts. In addition, the electronic apparatus 100 may identify the corresponding text data as the second text for describing the first portion of the video.

In addition, the electronic apparatus 100 may convert voice information of "If there is no potato, you may use sweet potato" and "potato of about one number may be roughly cut into easy-to-eat pieces" into text data, and may match the corresponding voice information with the second portion of the video corresponding to the text 10-2 of "cut potato" based on the degree of similarity to each of the plurality of first texts. In addition, the electronic apparatus 100 may identify the corresponding text data as the second text for describing the second portion of the video.

In addition, the electronic apparatus 100 may convert voice information of "I'm going to cook chicken now in big pot" into text data, and may match the corresponding voice information with the third portion of the video corresponding to the text 10-3 of 'boil (cook) chicken piece, carrot, mushroom, and the like' based on the degree of similarity to each of the plurality of first texts. In addition, the electronic apparatus 100 may identify the corresponding text data as the second text for describing the third portion of the video.

Figure 5:
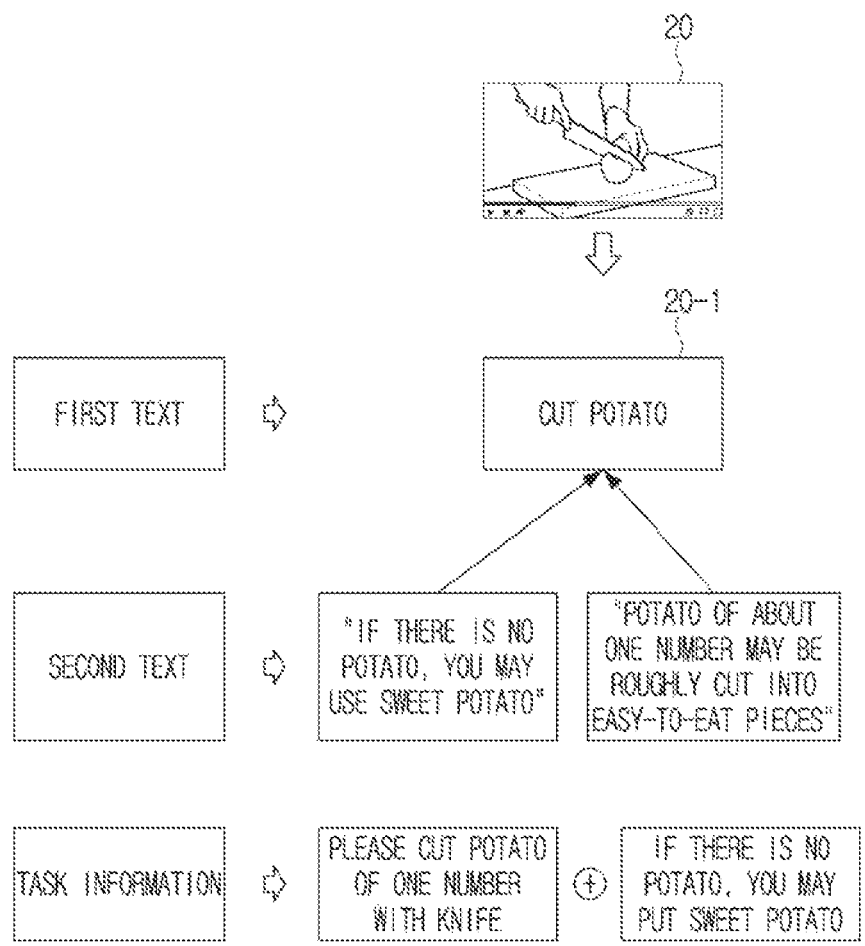
FIG. 5 is a diagram showing a process of generating task information corresponding to the corresponding image section based on a first task and a second task corresponding to one image section of a video according to an embodiment.

FIG. 5 is a diagram showing a process of generating task information corresponding to the corresponding portion of the video based on a first task and a second task corresponding to one portion of the video of a video according to an embodiment.

As shown in FIG. 4, when the first text and the second text corresponding to each of the portions of the video are acquired, the electronic apparatus 100 may acquire task information for performing a specific task based on the first text and the second text.

Referring to FIG. 5, the electronic apparatus 100 may acquire task information corresponding to the second portion of the video 20 among the plurality of portions of the video. Specifically, the electronic apparatus 100 may identify category information through the first text and the second text of the second portion of the video 20. That is, the electronic apparatus 100 may acquire object information of 'potato' and object information of 'cut' from the first text of the second portion of the video 20. In addition, the electronic apparatus 100 may acquire quantity information of 'one' and unit information of 'number' through the second text of "potato of about one number may be roughly cut into easy-to-eat pieces".

In addition, as an example, the electronic apparatus 100 may further acquire tool information by analyzing the image frames of the second portion of the video 20. That is, the electronic apparatus 100 may further acquire tool information of the 'knife' in the image frames of the second portion of the video 20. Here, the electronic apparatus 100 may acquire tool information of the 'knife' by using the object recognition model 1000. That is, the object recognition model 1000 corresponding to the cooking task may be an artificial intelligence model for acquiring food material information and tool information.

However, the disclosure is not limited thereto. That is, when the task information corresponding to the cooking task is acquired, the electronic apparatus 100 may acquire object information by using a first object recognition model for acquiring the food material information, and acquire tool information by using a second object recognition model for acquiring the tool material information. That is, the first object recognition model may be an artificial intelligence model learned based on only food materials, and the second object recognition model may be an artificial intelligence model learned based on only tool materials.

In addition, the electronic apparatus 100 may generate task information corresponding to the second portion of the video 20 based on the acquired category information. That is, the electronic apparatus 100 may generate task information of 'please cut potato of one number with knife' through the acquired object information, motion information, tool information, unit information, and quantity information. In addition, the electronic apparatus 100 may also identify the text of "If there is no potato, you may put sweet potato" among the second texts corresponding to the second portion of the video 20, as the task information of the second portion of the video 20. That is, the electronic apparatus 100 may identify and provide additional task information to supplement the task information in the second text together with the task information generated through the category information of the first text and the second text.

FIG. 6 is a diagram showing a process of additionally acquiring category information by further using a product recognition model, when category information acquired based on a first text and a second text corresponding to voice information is insufficient according to an embodiment.

As an example, the electronic apparatus 100 may identify an object of a corresponding portion of the video as 'pepper' and motion information as 'sprinkle' by using image information corresponding to an portion of the video. In addition, the electronic apparatus 100 may generate a text of 'sprinkle pepper' as a first text of the corresponding portion of the video.

In addition, the electronic apparatus 100 may convert voice information of 'sprinkle pepper lightly' corresponding to the corresponding portion of the video among the voice information into a text, and identify the converted text as a second text corresponding to the corresponding portion of the video.

In addition, the electronic apparatus 100 may identify category information through the first text and the second text.

The electronic apparatus 100 may identify that quantity information, unit information, and tool information have not been acquired through the first text and the second text. In addition, the electronic apparatus 100 may identify product information on 'pepper' corresponding to the object of the corresponding portion of the video through the product recognition model. The product recognition model may recognize product information on an object, and may perform learning through image data of a product. That is, the product recognition model may receive an image of a product and output product information on manufacturer information, container capacity information, and the like. That is, by inputting image information corresponding to the portion of the video of FIG. 6 into the product recognition model, the electronic apparatus 100 may acquire product information (50 g of pure pepper of company A) corresponding to the object of 'pepper'.

In addition, the electronic apparatus 100 may identify that the motion information corresponding to the object of 'pepper' is 'add three times through the upper right outlet' by further using the motion recognition model 2000. In addition, the electronic apparatus 100 may acquire category information corresponding to the corresponding portion of the video by using the acquired product information and motion information. In addition, the electronic apparatus 100 may generate task information of "Please add pepper three times using the upper right outlet based on 50 g of pure pepper of company A" based on the category information.

Figure 7A:
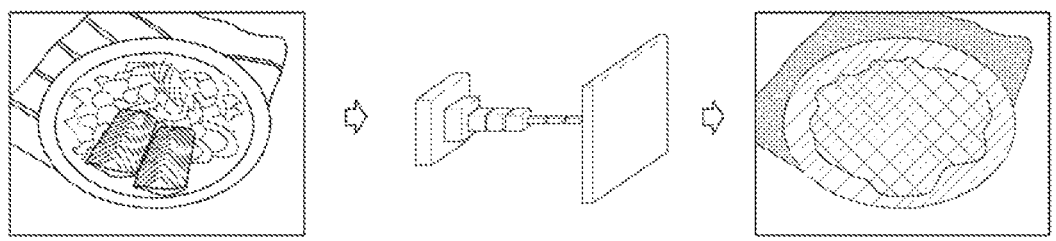
FIG. 7A is a diagram for describing a region recognition model according to an embodiment.
Figure 7B:
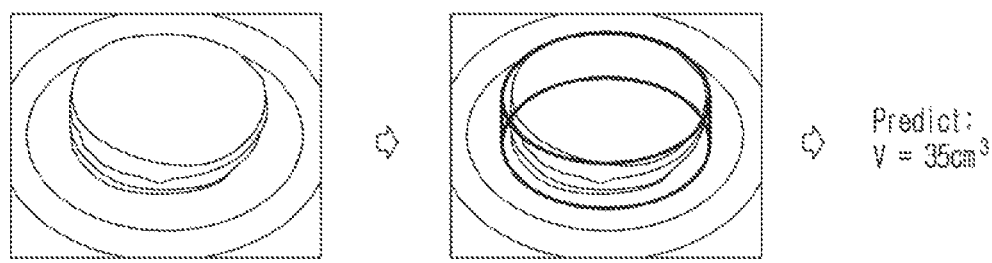
FIG. 7B is a diagram for describing a volume measurement model according to an embodiment.

FIG. 7A is a diagram for describing a region recognition model according to an embodiment. FIG. 7B is a diagram for describing a volume measurement model according to an embodiment.

The electronic apparatus 100 may acquire the category information based on the first text and the second text. However, when the category information acquired based on the first text and the second text is insufficient to generate the task information, the electronic apparatus 100 may acquire quantity information and unit information by using the region recognition model and the volume measurement model.

The region recognition model may receive an image frame and recognize a region corresponding to each object in the image frame, and may recognize the object in the image frame and identify a region corresponding to the recognized object among the image regions. As an example, the region recognition model may be implemented as a deep learning model that performs segmentation.

That is, as shown in FIG. 7A, the region recognition model may receive an image frame and distinguish a region corresponding to a bowl and a region corresponding to an object (food).

The volume measurement model may receive an image frame and measure a volume of an object in the image frame. That is, as shown in FIG. 7B, the volume measurement model may recognize a region corresponding to the object in the image frame and measure the volume of the object through the corresponding region. As an example, the volume measurement model may be implemented as a deep learning model that predicts the volume of the region corresponding to the object.

Figure 8:
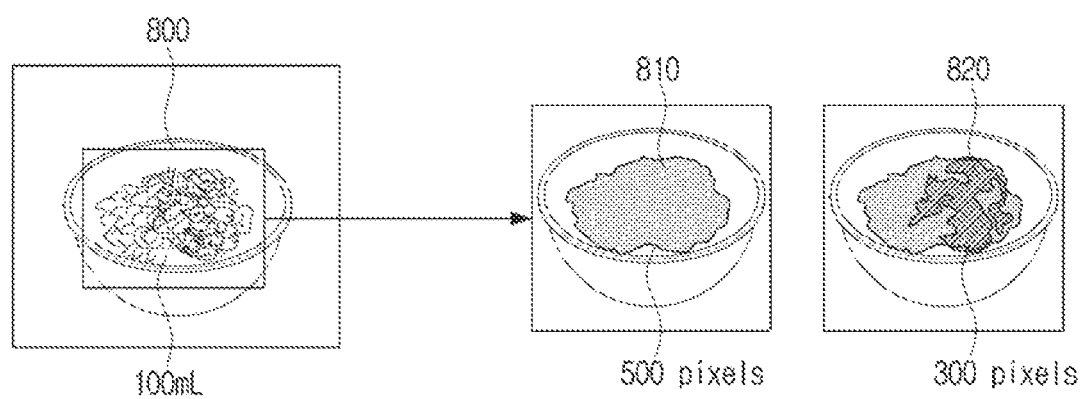
FIG. 8 is a diagram showing a process of additionally acquiring category information by further using a region recognition model and a volume measurement model, when category information acquired based on a first text and a second text corresponding to voice information is insufficient according to an embodiment.

FIG. 8 is a diagram showing a process of additionally acquiring category information by further using a region recognition model and a volume measurement model, when category information acquired based on a first text and a second text corresponding to voice information is insufficient according to an embodiment.

Referring to FIG. 8, the electronic apparatus 100 may identify volume information of a container containing an object in one image frame through the volume measurement model.

In addition, the electronic apparatus 100 may identify a region of each object in the container by using the region recognition model. As an example, referring to FIG. 8, in order to acquire category information of an portion of the video corresponding to a first text of "Put sesame seeds", the electronic apparatus 100 may identify a region 800 corresponding to the container in the image frame corresponding to the corresponding portion of the video through the volume measurement model, and identify volume information of the container as 100 ml through the corresponding region. In addition, the electronic apparatus 100 may recognize a region 810 corresponding to all objects in the container and a region 820 corresponding to the sesame seeds in the image frame corresponding to the corresponding portion of the video by using the region recognition model. In addition, the electronic apparatus 100 may identify quantity information and unit information corresponding to the object of 'sesame seeds' based on the recognition result. That is, referring to FIG. 8, because the region 810 corresponding to all objects is 500 pixels, the region 820 corresponding to sesame seed is 300 pixels, and the volume information of the container is identified as 100 ml, the electronic apparatus 100 may identify the volume information of the sesame seeds as '60' and identify the unit information (100×(300 pixels/500 pixels)=60) as 'ml'. In addition, the electronic apparatus 100 may acquire task information of "Please add 60 ml of sesame seeds" by further using the acquired volume information and unit information.

Figure 9:
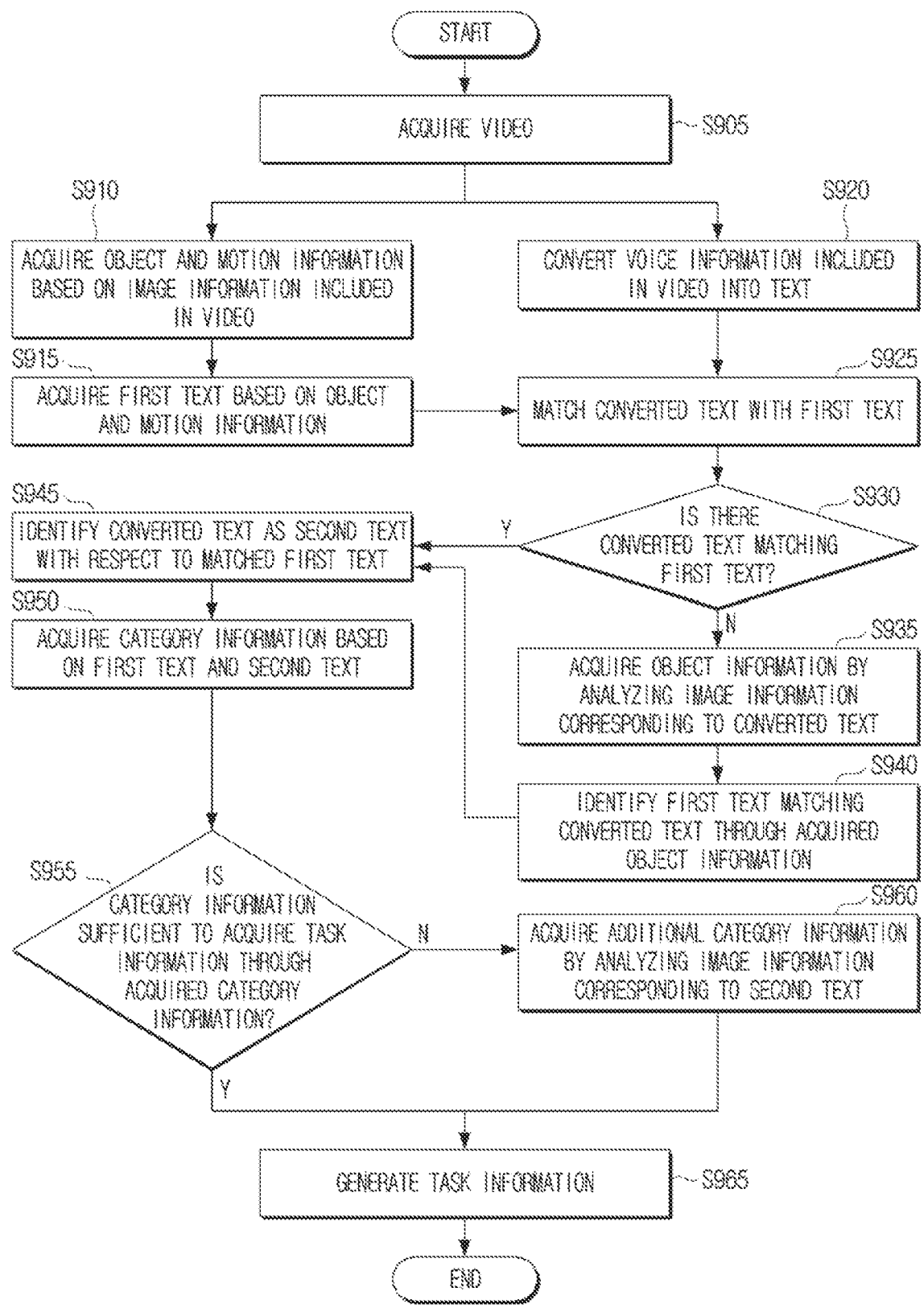
FIG. 9 is a flowchart showing a specific method of acquiring task information according to an embodiment.

FIG. 9 is a flowchart of a method of acquiring task information according to an embodiment.

First, the electronic apparatus 100 may acquire a video (S905). The video may include content for performing a specific task, such as content for cooking. For example, the electronic apparatus 100 may acquire or download the video from an external server in a streaming manner.

At operation S910, when the video is acquired, the electronic apparatus 100 may acquire object and motion information based on image information included in the video. That is, the electronic apparatus 100 may acquire an object (e.g., potato) and motion information (e.g., cut) on the object included in one portion of the video of the video. That is, the electronic apparatus 100 may acquire an object and motion information from each of the image frames included in the video, and identify image frames having the same acquired object and motion information as one portion of the video. That is, the electronic apparatus 100 may identify the entire image frame for cutting a potato with a knife as one portion of the video.

At operation S915, electronic apparatus 100 may acquire a first text (e.g., cut potato) based on the object and the motion information.

At operation S920, the electronic apparatus 100 may convert voice information included in the video into text. At operation S925, the electronic apparatus 100 may match the converted text with the first text. That is, the electronic apparatus 100 may match a plurality of texts converted through the voice information with the first text of each of the plurality of portions of the video.

At operation S930, the electronic apparatus 100 may identify whether there is a converted text matching the first text.

If there is a text matching the first text among the converted texts (Y in S930), the electronic apparatus 100 may identify the converted text as a second text with respect to the matched first text (S945). At operation S950, the electronic apparatus 100 may acquire category information based on the first text and the second text.

As an example, the electronic apparatus 100 may acquire a first text for a first portion of the video by acquiring an object and motion information for the first portion of the video among a plurality of portions included in the video. In addition, the electronic apparatus 100 may compare the degree of similarity with each of the plurality of texts converted through operation S920 to identify the text matching the first text of the first portion of the video as the second text, and may acquire category information on the first portion of the video by using the identified second text and the first text.

If there is no text matching the first text among the converted texts (N in S930), the electronic apparatus 100 may acquire object information by analyzing image information corresponding to the converted text (S935). That is, the electronic apparatus 100 may identify a text that does not match the first text among the plurality of texts converted in S920, and acquire object information by analyzing image information corresponding to voice information of the identified converted text. As an example, the image information corresponding to the voice information of the identified converted text may be an image frame of a portion of the video corresponding to a time point at which the corresponding voice information is output.

That is, at operation S940, the electronic apparatus 100 may identify the first text matching the converted text through the object information acquired by analyzing the image information. The electronic apparatus 100 may identify the first text including the object information acquired by analyzing the image information. At operation S945, the electronic apparatus 100 may identify the converted text as a second text with respect to the matched first text, and, at operation S950, the electronic apparatus 100 may acquire category information based on the first text and the second text.

At operation S955, the electronic apparatus 100 may identify whether the category information is sufficient to acquire task information. As an example, when the category information of at least one of object information, quantity information, unit information, tool information, and operation information is not acquired, the electronic apparatus 100 may identify as insufficient to acquire the task information. However, the disclosure is not limited thereto, and when at least one of the quantity information and the unit information among the plurality of category information is not acquired through the first text and the second text, the electronic apparatus 100 may identify as insufficient to generate the task information.

If as the category information is insufficient to acquire the task information (N in S955), the electronic apparatus 100 may acquire additional category information by analyzing image information corresponding to the second text (S960). As an example, the electronic apparatus 100 may acquire the additional category information by further using the product recognition model, the volume measurement model, and the region recognition model, which will be described later with reference to FIG. 10.

At operation S965, if the additional category information is acquired, the electronic apparatus 100 may generate task information (S965). That is, the electronic apparatus 100 may generate the task information corresponding to one portion of the video by using the category information and the additional category information acquired through the first text and second text corresponding to one portion of the video.

If as the category information is sufficient to acquire the task information (Y in S955), the electronic apparatus 100 may generate task information (S965). That is, the electronic apparatus 100 may generate the task information corresponding to one portion of the video by using the category information acquired through the first text and second text corresponding to one portion of the video.

In addition, the electronic apparatus 100 may provide information for performing a specific task included in the video by synthesizing task information generated for each of the portions of the video.

Figure 10:
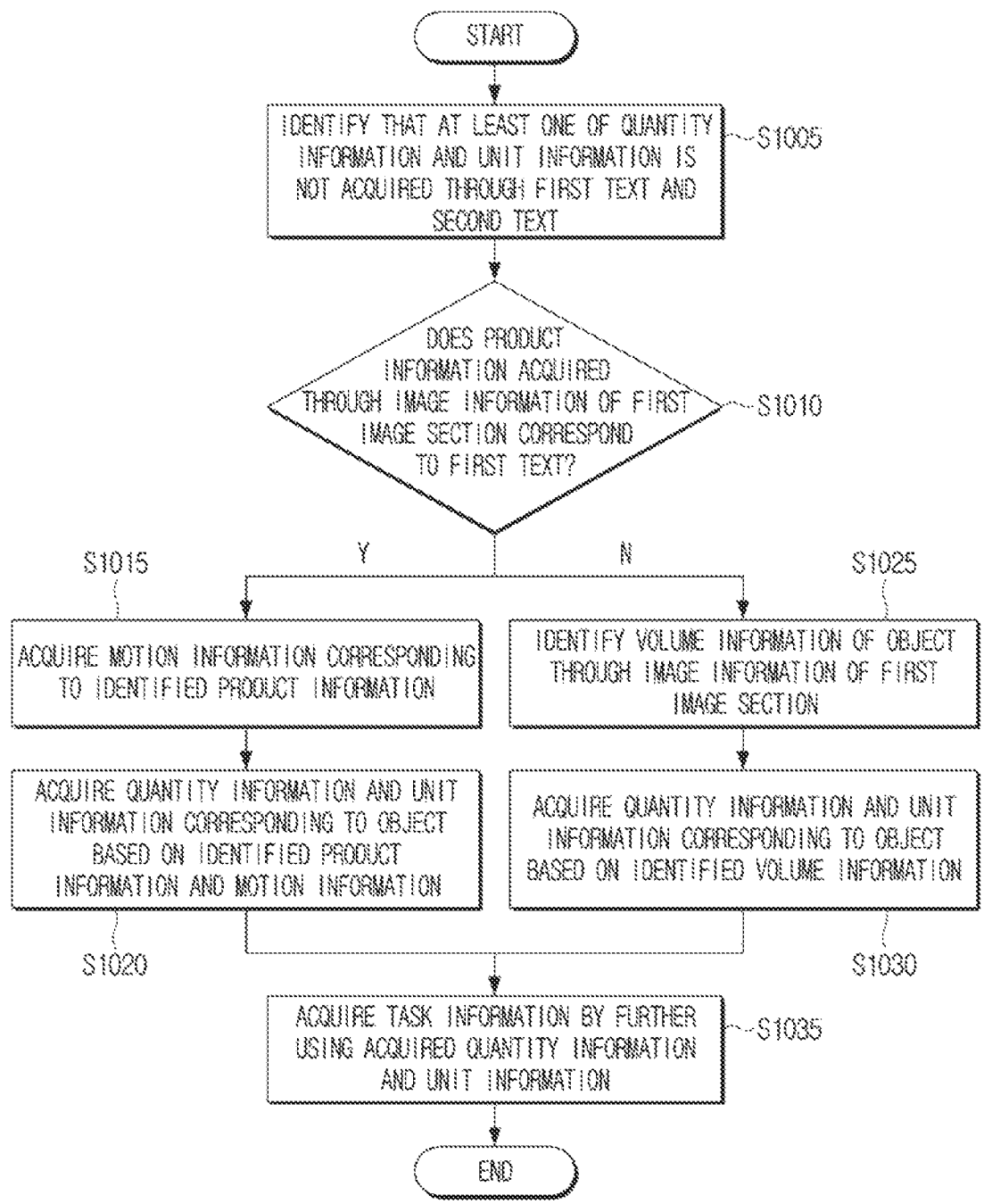
FIG. 10 is a flowchart showing a method for acquiring additional category information according to an embodiment.

FIG. 10 is a flowchart of a method for acquiring additional category information according to an embodiment.

Referring to FIG. 9, in operation S955, the electronic apparatus 100 may determine that the category information acquired in operation S950 is insufficient to acquire task information. Specifically, at operation S1005, the electronic apparatus 100 may identify that at least one of quantity information and unit information has not been acquired through the first text and the second text.

At operation S1010, the electronic apparatus 100 may identify whether product information is acquired through image information of the first portion of the video corresponding to the first text. Specifically, the electronic apparatus may acquire product information of the object in the first portion of the video through the product recognition model described with reference to FIG. 6.

If the product information is acquired through the image information (Y in S1010), the electronic apparatus 100 may acquire motion information corresponding to the identified product information. As an example, as described with reference to FIG. 6, the electronic apparatus 100 may acquire the motion information on the object by analyzing the corresponding portion of the video.

In addition, the electronic apparatus 100 may acquire quantity information and unit information corresponding to the object based on the identified product information and motion information (S1020). In addition, the electronic apparatus 100 may acquire task information by further using the acquired quantity information and unit information (S1035).

If the product information is not acquired through the image information (N in S1010), the electronic apparatus 100 may identify volume information of the object through the image information of the first portion of the video (S1025). That is, as described with reference to FIG. 8, the electronic apparatus 100 may identify volume information of the object in the image frame by using region recognition model and the volume measurement model.

At operation S1030, the electronic apparatus 100 may acquire quantity information and unit information corresponding to the object based on the identified volume information. At operation S1035, the electronic apparatus 100 may acquire task information by further using the acquired quantity information and unit information.

Figure 11:
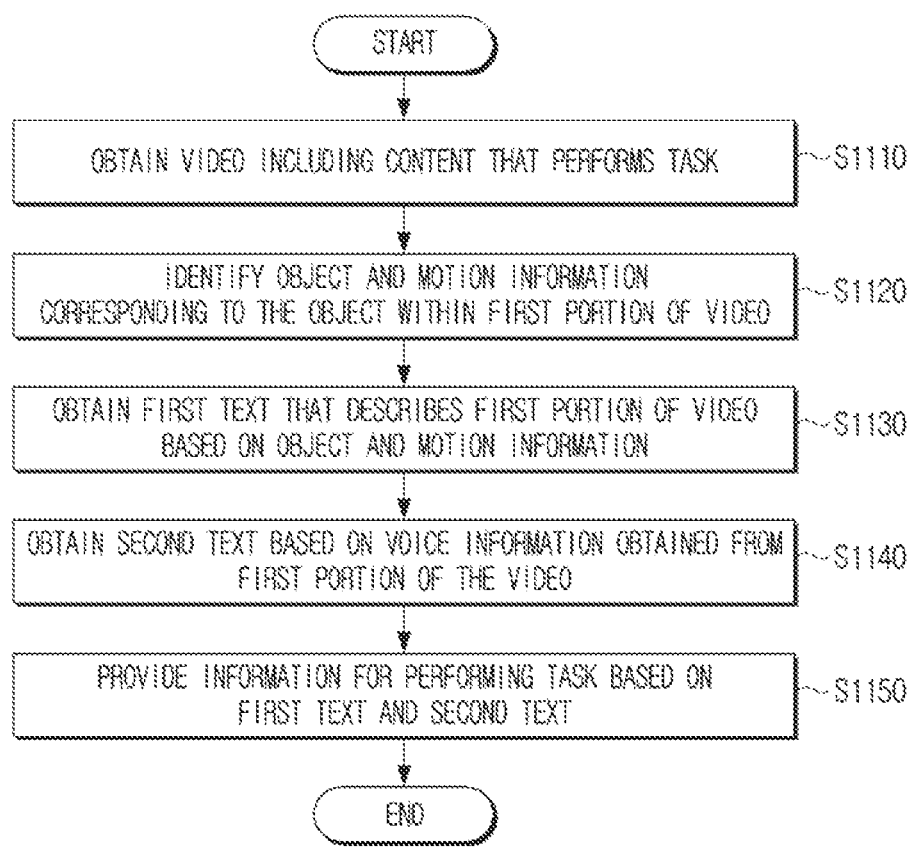
FIG. 11 is a flowchart for describing an operation of an electronic apparatus according to an embodiment.

FIG. 11 is a flowchart of an operation of an electronic apparatus according to an embodiment.

At operation S1110, the electronic apparatus 100 may obtain a video including content that performs a task. As an example, the electronic apparatus 100 may receive content that performs the task from an external device or an external server as a stream. However, the disclosure is not limited thereto, and the video may be acquired by various methods.

At operation S1120, the electronic apparatus 100 may identify an object included in an image within a first portion of the video and motion information corresponding to the object during the first portion of the video. For example, the electronic apparatus 100 may identify an object and motion information corresponding to the object in each image frame included in the video, and identify a plurality of image frames in which a first object and first motion information are identified as the first portion of the video. In addition, as an example, the electronic apparatus 100 may identify an object and motion information corresponding to the object in a reproduced image frame while receiving and reproducing the video in a streaming manner.

At operation S1130, the electronic apparatus 100 may obtain first text that describes the first portion of the video based on the object and the motion information.

At operation 1140, the electronic apparatus 100 may acquire a second text based on voice information obtained from the first portion of the video (S1140).

As an example, the electronic apparatus 100 may convert voice information included in the video into text. In addition, the electronic apparatus 100 may acquire the degree of similarity between the first text and the converted texts, and identify a text related to the first text among the converted texts as a second text for describing the first portion of the video.

As an example, the electronic apparatus 100 may identify a text matching the first text as the second text for describing the first portion of the video by analyzing the image corresponding to the voice information. That is, the electronic apparatus 100 may acquire object information by analyzing an image frame corresponding to a time point at which the voice information is output, and identify voice information matching the first text of the first portion of the video as the second text based on the object information.

At operation S1150, the electronic apparatus 100 may provide information for performing a task based on the first text and the second text.

As an example, the electronic apparatus 100 may provide the information for performing the task through the category information identified from the first text and the second text, where the category information may include object information, quantity information, unit information, tool information, and motion information. However, the category information according to the disclosure is not limited thereto, and according to an implementation aspect of the disclosure, other category information may be added or at least one category information may be omitted.

In addition, the electronic apparatus 100 may acquire first category information from the first text and may acquire second category information from the second text. That is, the electronic apparatus 100 may acquire first category information on object information and motion information from the first text. In addition, the electronic apparatus 100 may acquire at least one of object information, quantity information, unit information, tool information, and motion information from the second text.

In addition, the electronic apparatus 100 may identify whether a combination of the first category information and the second category information is sufficient to acquire information for performing a task corresponding to the first portion of the video.

When it is insufficient to acquire the information for performing the task corresponding to the first portion of the video as an identification result, the electronic apparatus 100 may acquire third category information by analyzing the image within the first portion of the video. That is, the electronic apparatus 100 may acquire the third category information through the task information correction module 135.

As an example, the electronic apparatus 100 may acquire product information on an object by analyzing the image within the first portion of the video through the product recognition model. In addition, the electronic apparatus 100 may acquire motion information corresponding to the product information through the motion recognition model. In addition, the electronic apparatus 100 may acquire at least one of quantity information and unit information based on the product information and the motion information.

As an example, the electronic apparatus 100 may acquire volume information corresponding to the object by performing image segmentation for the image within the first portion of the video. That is, the electronic apparatus 100 may acquire volume information of the object by analyzing the image within the first portion of the video through the volume measurement model and the region recognition model, and acquire quantity information and unit information corresponding to the object through the volume information.

In addition, the electronic apparatus 100 may acquire information for performing a task corresponding to the first portion of the video by using the first category information, the second category information, and the third category information.

When the category information is sufficient to acquire the information for performing the task corresponding to the first portion of the video as the identification result, the electronic apparatus 100 may acquire the information for performing the task corresponding to the first portion of the video by using the first category information and the second category information (S1150).

Figure 12:
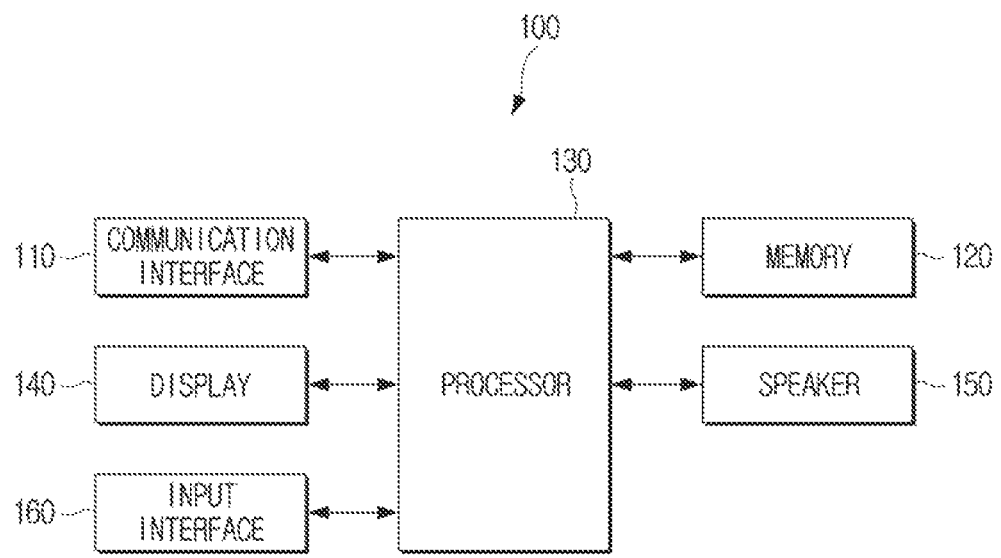
FIG. 12 is a block diagram showing a detailed configuration of an electronic apparatus according to an embodiment.

FIG. 12 is a block diagram showing a configuration of an electronic apparatus according to an embodiment.

As shown in FIG. 12, the electronic apparatus 100 may include a communication interface 110, a memory 120, a processor 130, a display 140, a speaker 150, and an input interface 160. In the configuration of the electronic apparatus 100 shown in FIG. 12, some components may be added or omitted depending on the type of the electronic apparatus 100.

The memory 120 may store instruction or data related to one or more other components of the electronic apparatus 100. In particular, the memory 120 may be implemented as a non-volatile memory, a volatile memory, a flash-memory, a hard-disk drive (HDD), a solid state drive (SDD), or the like. The memory 120 is accessed by the processor 130, and readout, recording, correction, deletion, update, and the like, of data in the memory 120 may be performed by the processor 130.

In the disclosure, a term "memory" includes the memory 120, a read only memory (ROM) in the processor 130, a random access memory (RAM), or a memory card (e.g., a micro secure digital (SD) card or a memory stick) mounted in the electronic apparatus 100. In addition, the memory 120 may store programs and data for configuring a variety of screens to be displayed on a display region of the display.

As described above, the memory 120 may store one or more instructions. The instruction may be for controlling the electronic apparatus 100. For example, instructions related to an artificial intelligence model for analyzing an image may be stored in the memory 120.

One or more processors may perform a control to process input data according to predefined operating rules or artificial intelligence models stored in the memory 120. The predefined operating rules or artificial intelligence models are characterized by being created through learning. The predefined operating rules or artificial intelligence models being created through learning refer to the predefined operating rules or artificial intelligence models having desired characteristics being created by applying learning algorithms to a large number of learning data. Such learning may be performed in a device itself in which the artificial intelligence according to the disclosure is performed, or may also be performed through a separate server/system.

The artificial intelligence model may include a plurality of neural network layers. Each layer may have a plurality of weight values, and a layer calculation is performed by calculating a calculation result of a previous layer and the plurality of weight values. Examples of the neural network include a convolutional neural network (CNN), a deep neural network (DNN), a recurrent neural network (RNN), a restricted Boltzmann machine (RBM), a deep belief network (DBN), a bidirectional recurrent deep neural network (BRDNN), and deep Q-networks, and the neural network in the disclosure is not limited to the examples described above except as otherwise specified.

The processor 130 (or multiple processors) may drive an operating system or an application program to control hardware or software components connected to the processor 130 and to perform various kinds of data processing and calculation. In addition, the processor 130 may load a command or data received from at least one of other components on a volatile memory to process the command or data, and store various kinds of data in a non-volatile memory.

The display 140 may display various types of information according to the control of the processor 130. The display 140 may display a screen provided by at least one application executed in a foreground in the electronic apparatus 100.

In addition, the display 140 may display the acquired video. That is, the processor 130 may identify the object and motion information from the displayed image frame while displaying the video on the display.

In addition, the display 140 may be implemented as various types of displays such as a liquid crystal display panel (LCD), a light emitting diode (LED), an organic light emitting diode (OLED), a liquid crystal on silicon (LCoS), and digital light processing (DLP). In addition, the display 140 may also include a driving circuit, a backlight unit, and the like which may be implemented in the form of an a-si TFT, a low temperature poly silicon (LTPS) TFT, and an organic TFT (OTFT). In addition, the display 140 may be implemented as various displays such as a foldable display and a rollable display. In addition, the display 140 may be coupled to a touch detector and implemented as a touch screen.

The speaker 150 may be a component that outputs not only various audio data externally received but also various notification sounds or voice messages. The electronic apparatus 100 may include an audio output device such as the speaker 150, but may include an output device such as an audio output terminal. In particular, the speaker 150 may output voice information included in the video.

In addition, the electronic apparatus 100 may include an input interface 160 that receives a user command for controlling the electronic apparatus 100. The input interface 160 may be implemented as a device such as a button, a touch pad, a mouse, or a keyboard, or may also be implemented as a touch screen that may also perform the display function described above and a manipulation/input function. The button may be various types of buttons, such as mechanical buttons, touch pads, wheels, and the like, which are formed in arbitrary areas such as a front portion, a side portion, and a back portion of an exterior of a main body of the electronic apparatus 100.

The descriptions described above includes various modifications, equivalents, and/or alternatives according to the embodiments. In connection with the description of the drawings, similar reference numerals may be used for similar components.

An embodiment may be implemented by software including instructions that are stored in machine (e.g., a computer)-readable storage media. The machine may be an apparatus that invokes the stored instructions from the storage media and is operable according to the invoked instructions, and may include a multilayer display device according to the embodiments. When the instructions are executed by the processor, the processor may perform functions corresponding to the instructions, either directly or using other components under the control of the processor. The instructions may include codes generated or executed by a compiler or an interpreter. The machine-readable storage medium may be provided in the form of non-transitory storage medium. The term 'non-transitory' means that the storage medium does not include a signal and is tangible, but does not distinguish whether data is stored semi-permanently or temporarily in the storage medium.

According to an embodiment, the method according to an embodiments may be included and provided in a computer program product. The computer program product may be traded as a product between a seller and a purchaser. The computer program product may be distributed in the form of a storage medium (for example, a compact disc read only memory (CD-ROM)) that may be read by a device, or online through an application store (for example, PlayStore™). In the case of the online distribution, at least a portion of the computer program product may be at least temporarily stored in a storage medium such as a memory of a server of a manufacturer, a server of an application store, or a relay server, or be temporarily generated.

Each of the components (e.g., modules or programs) according to embodiments may include a single entity or a plurality of entities, and some sub-components of the sub-components described above may be omitted, or other sub-components may be further included in the embodiments. Alternatively or additionally, some components (e.g., modules or programs) may be integrated into one entity to perform the same or similar functions performed by the respective components prior to the integration. The operations performed by the module, the program, or other component according to the embodiments may be performed in a sequential, parallel, iterative, or heuristic manner, or at least some operations may be executed in a different order or omitted, or other operations may be added.

The invention claimed is:

1. A method for controlling an electronic apparatus, the method comprising:
obtaining a video including content that performs a task;
identifying, within a first portion of the video, an object and motion information corresponding to the object;
obtaining first text that describes the first portion of the video based on information corresponding to the object and the motion information;
obtaining second text based on voice information obtained from the first portion of the video; and
providing information for performing the task based on the first text and the second text,
wherein the obtaining of the second text comprises;
converting the voice information obtained from the first portion of the video into text; and
selecting text related to the first text among converted texts as the second text for describing the first portion of the video based on a degree of similarity between the first text and the converted text.

2. The method as claimed in claim 1, wherein the obtaining the second text further comprises obtaining the text that is related to the first text as the second text for describing the first portion of the video by analyzing an image corresponding to the voice information.

3. The method as claimed in claim 1, wherein the information for performing the task is obtained based on category information obtained from the first text and the second text, and
the category information includes one or more of object information, quantity information, unit information, tool information, or the motion information.

4. The method as claimed in claim 3, wherein the providing of the information for performing the task comprises:
obtaining first category information from the first text;
obtaining second category information from the second text; and
determining whether a combination of the first category information and the second category information is sufficient to obtain information for performing a sub-task corresponding to the first portion of the video.

5. The method as claimed in claim 4, further comprising:
obtaining, based on a determination that the combination of the first category information and the second category information is insufficient, third category information by analyzing an image within the first portion of the video to obtain the information for performing the sub-task corresponding to the first portion of the video; and
obtaining the information for performing the sub-task corresponding to the first portion of the video based on the first category information, the second category information, and the third category information.

6. The method as claimed in claim 5, wherein the obtaining the third category information comprises:
obtaining product information corresponding to the object; and
obtaining at least one of quantity information or unit information based on the product information and the motion information corresponding to the object.

7. The method as claimed in claim 5, wherein the obtaining the third category information comprises:
obtaining volume information corresponding to the object by performing image segmentation for the object; and
obtaining at least one of quantity information or unit information based on the volume information.

8. The method as claimed in claim 4, further comprising:
obtaining, based on a determination that the combination of the first category information and the second category information is sufficient, the information for performing sub-tasks corresponding to the first portion of the video; and
providing the information for performing the task by acquiring information for performing a sub-task corresponding to each portion of the video among a plurality of portions.

9. The method as claimed in claim 1, wherein the video is obtained from a stream, and
wherein the object and the motion information are identified while the video is reproduced.

10. An electronic apparatus comprising:
a memory configured to store one or more instructions; and
one or more processors configured to execute the one or more instructions stored in the memory to:
obtain a video including content that performs a task;
identify, within a first portion of the video, an object and motion information corresponding to the object;
obtain first text that describes the first portion of the video based on information corresponding to the object and the motion information;
obtain second text based on voice information obtained from the first portion of the video; and
provide information for performing the task based on the first text and the second text,
wherein the one or more processors are further configured to execute the one or more instructions to:
convert the voice information obtained from the first portion of the video into text; and
select text related to the first text among converted texts as the second text for describing the first portion of the video based on a degree of similarity between the first text and the converted text.

11. The electronic apparatus as claimed in claim 10, wherein the one or more processors are further configured to execute the one or more instructions to obtain the text that is related to the first text as the second text for describing the first portion of the video by analyzing an image corresponding to the voice information.

12. The electronic apparatus as claimed in claim 10, wherein the information for performing the task is obtained based on category information obtained from the first text and the second text, and
the category information includes one or more of object information, quantity information, unit information, tool information, or the motion information.

13. The electronic apparatus as claimed in claim 12, wherein the one or more processors are further configured to execute the one or more instructions to:
obtain first category information from the first text;
obtain second category information from the second text; and
identify whether a combination of the first category information and the second category information is sufficient to obtain information for performing a sub-task corresponding to the first portion of the video.

* * * * *